United States Patent [19]

Lubarsky, Jr.

[11] 3,737,766

[45] June 5, 1973

[54] TESTING TECHNIQUE FOR PHASE JITTER IN COMMUNICATION SYSTEMS

[75] Inventor: Andre Lubarsky, Jr., Sunnyvale, Calif.

[73] Assignee: Telecommunications Technology, Incoporated, Sunnyvale, Calif.

[22] Filed: Dec. 6, 1971

[21] Appl. No.: 205,242

[52] U.S. Cl. ................................324/57 R, 324/83 A

[51] Int. Cl. ..........................G01r 27/00, G01r 25/00

[58] Field of Search...................324/57, 57 N, 57 PS, 324/181, 186, 78 Q, 83 A, 83 D, 102; 328/162, 165; 128/2.06 A

[56] References Cited

UNITED STATES PATENTS

| | | | |
|---|---|---|---|
| 3,533,402 | 10/1970 | Siedband | 128/2.06 A |
| 3,675,485 | 7/1972 | Loeb | 324/77 R X |

*Primary Examiner*—Alfred E. Smith

*Attorney*—Karl A. Limbach, George C. Limbach, John P. Sutton et al.

[57] ABSTRACT

A method and apparatus for measuring phase jitter by monitoring the period of a communication signal output of a communication system each one-half cycle. At each one-half cycle, the width of the signal output is compared with an average one-half period of the signal. Both digital and analog techniques are disclosed for displaying a peak-per-cycle phase jitter and a cumulative peak-to-peak phase jitter of the signal.

19 Claims, 7 Drawing Figures

TESTING TECHNIQUE FOR PHASE JITTER IN COMMUNICATION SYSTEMS

BACKGROUND OF THE INVENTION

This invention relates generally to techniques for measuring the quality of an electronic communication system, and more particularly relates to techniques for measuring the degree to which a communication system imparts phase jitter onto an information signal passing therethrough.

Phase jitter is an unwanted angle modulation imparted to a signal while it is being transmitted over a communication circuit. Regardless of whether it is introduced by a terminal, multiplex or radio equipment, it takes the form of frequency modulation and/or phase modulation.

In its simplest terms, phase jitter may be viewed as a disturbance in the periodicity of the zero crossings of a signal. As such, it may be observed on an oscilloscope at an output of a communications circuit in the form of a blurred or "jittery" display of a test tone applied to an input of the communications circuit. The observer can gain a qualitiative feel for the magnitude of the jitter simply by noting the amount of blurring that is present on the oscilloscope display of the waveform passing through a communication circuit. This technique was one of the earliest methods of observing this parameter of a communication circuit.

Although phase jitter has been recognized for some time, it has been considered a negligible factor in the transmission of voice signals and low speed data. With today's increasing data speeds, however, jitter is becoming a much more significant problem. Data sets operating at 4,800 and 9,600 bits per second are particularly sensitive to any jitter imparted to the signal as it passes through a communication circuit. Phase jitter is a primary cause of transmission errors when data are transmitted over voice communication circuits at such rates.

Previously available phase jitter test sets are restricted for monitoring a single test tone frequency at the output of a communication circuit. Previous phase jitter test sets primarily function by comparing a large number of cycles of the test tone at the output of a communication circuit with the period of the test signal input to the communication circuit. As a result, such test sets are capable of measuring only low frequency jitter components, such as those in a range of 20 Hz. to 300 Hz. that are attributed largely to derivative effects of power supply ripple components and to grounding problems. Both the magnitude and frequency of these jitter components are independent of the test tone frequency used.

It is a primary object of the present invention to provide a phase jitter testing technique which is not limited to a single test tone frequency but rather which may be utilized with test frequencies covering the full range of frequencies for which the communication circuit is capable of operating.

It is another object of the present invention to provide a phase jitter testing technique for measuring jitter components of a higher frequency than is possible with previously available phase jitter test sets.

It is yet another object of the present invention to provide a new phase jitter measuring parameter.

SUMMARY OF THE INVENTION

These and additional objects are realized according to the techniques of the present invention wherein the phase length of each one-half cycle of the test tone at the output of a communication circuit under observation is measured and compared to an average one-half cycle period of the test tone at the output of the communication circuit. The phase differences between individual one-half cycles of the test tone and the average one-half cycle period reference provide much useful information concerning phase jitter of the communication circuit. The maximum of peak-per-cycle phase difference gives information of jitter that has not before been available and which is especially useful in determining high frequency jitter components. The standard peak-to-peak phase jitter quantity may also be derived by summing all the individual one-half cycle phase differences. Both methods yield accurate measurements for jitter components equal to the test tone frequency.

Since phase jitter is measured relative to an average period derived from the output of the communications circuit, the frequency of the test tone delivered to the communication circuit input may be varied over a wide range. The frequency and magnitude of jitter imparted by a communication circuit may vary significantly as a function of the frequency of the signal. Therefore, having a wide frequency range capability permits the phase jitter testing technique of the present invention to determine much more information about the communication circuit.

The basic phase jitter testing techniques of the present invention are described in some detail in an article by the applicant herein appearing in *IEEE Transactions on Communication Technology*, October, 1971, pp. 736–737, entitled "A Digital Method of Measuring Phase Jitter." This published article is incorporated herein by reference.

For further objects, advantages and features of the method and apparatus of the present invention in their various aspacts, reference should be had to the following description taken in conjunction with the accompanying drawings.

DESCRIPTION OF THE PREFERRED EMBODIMENTS

Figure 1:
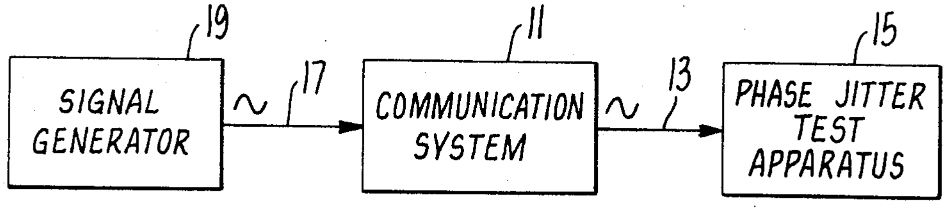
FIG. 1 schematically illustrates the general testing of a communication system by using a phase jitter test apparatus according to the present invention.

Referring to FIG. 1, a communication system 11 under test is connected at its output 13 to phase jitter test apparatus 15. At an input 17 to the communication system is connected a signal generator 19. The signal generator 19 generally will produce a single frequency sine wave test tone with the frequency thereof adjustable. The phase jitter test apparatus 15, therefore, observes the signal frequency waveform after it has passed through the communication system 11. For the purposes of describing specific examples herein, the communication system 11 is considered to be of the type that transmits one or more voice channels having a bandwidth of from about 300 Hz. to about 3,000 Hz.

The communication system 11 imparts a phase jitter onto the single frequency signal presented at its input 17. Therefore, its output 13 is frequency and/or phase modulated. That is, the output waveform of the communication system 11 includes a fundamental component of the input waveform plus undesired modulating components imparted thereto within the communication system 11. The phase jitter is evident from FIG. 2A, which illustrates a possible output waveform at 13, because of the irregularity of the periods at which the waveform crosses the zero line. In the specific example chosen for illustration as FIG. 2A, three individual periods of the output waveform are denoted at $\tau_i$. The quantity $\tau_i$ is equal to the period of the sinusoidal waveform at the input 17 of the communication system 11. The othe cycles of the output waveform of FIG. 2A are either longer or shorter than $\tau_i$. However, the average period of the waveform of FIG. 2A is, in this example, equal to $\tau_i$. It is the nature of this undersirable modulation that is imparted by the communication system 11 onto the input signal that is examined by the phase jitter test apparatus 15. According to the phase jitter testing techniques of the present invention, additional new and useful information concerning this undesirable modulation is obtained.

The phase jitter test apparatus 15 first converts the output waveform of the communication system (FIG. 2A) into a square wave as illustrated in FIG. 2B. A square wave makes it easier to obtain phase jitter information concerning the output waveform of FIG. 2A, as is explained hereinafter. For the purpose of these phase jitter testing techniques, the square wave of FIG. 2B contains the same information as the sinusoidal output waveform of FIG. 2A since the characteristic of primary importance is the location where the waveform crosses its zero line, and in this regard the waveforms of FIGS. 2A and 2B are the same. It will be understood, of course, that the specific shape of the waveforms illustrated in FIGS. 2A and 2B are exemplary only for the purposes of explaining the improved techniques of the present invention and that in actual practice the waveforms may be of most any irregular frequency depending on the specific undesirable modulation of the communication system, the test tone frequency and other factors.

Figure 2:
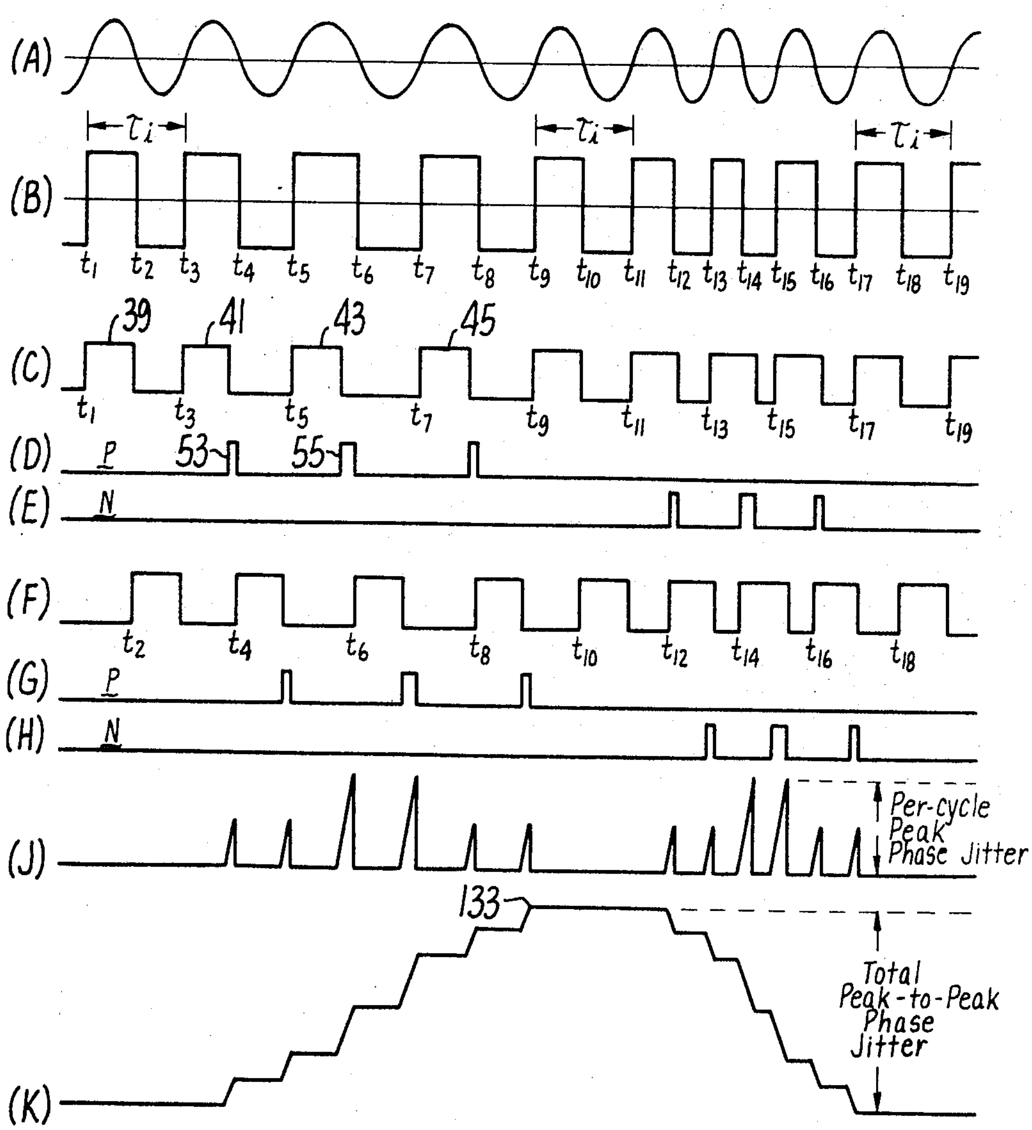
FIG. 2 is a plurality of sample waveforms at various points in a phase jitter test apparatus specifically described.
Figure 3:
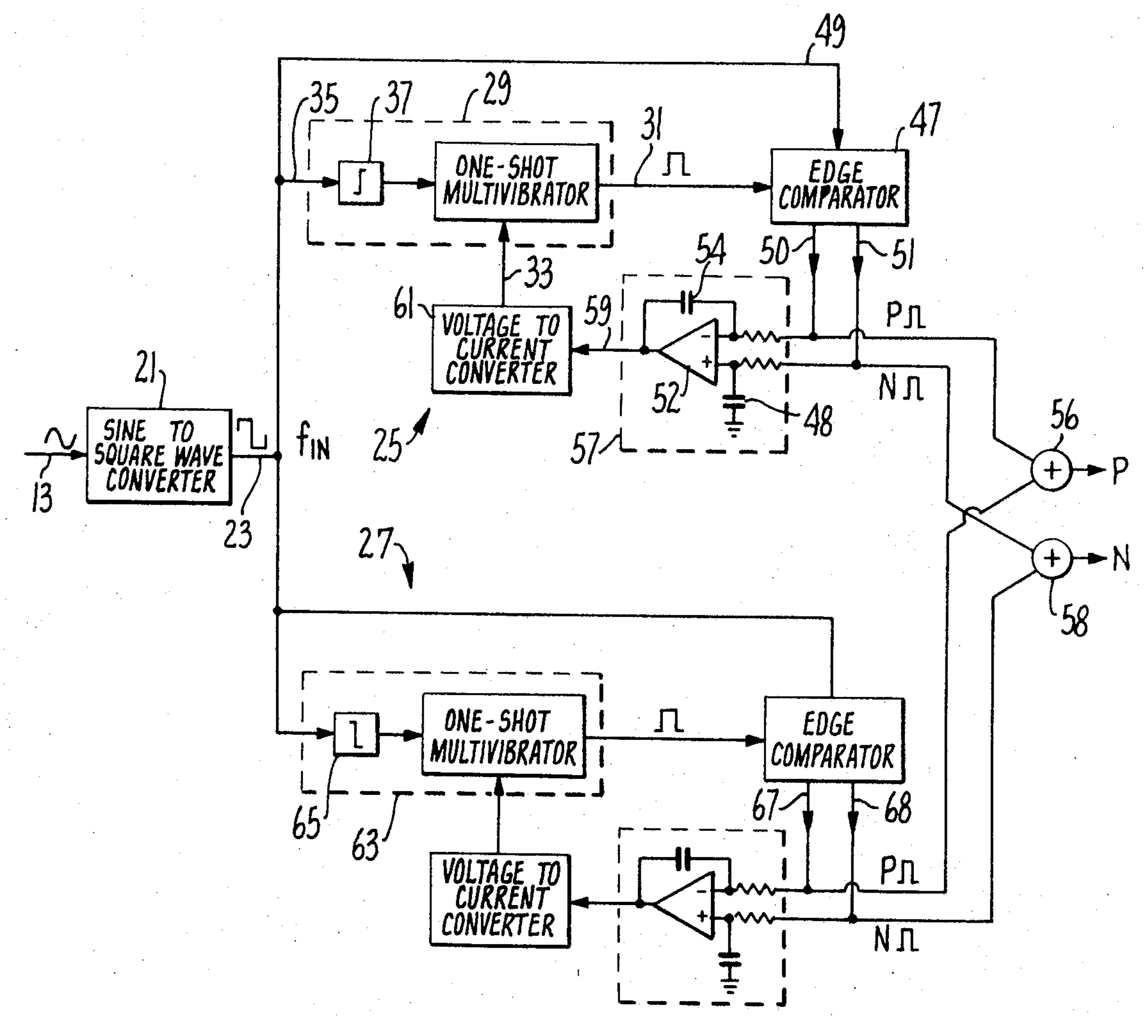
FIG. 3 schematically illustrates in block diagram form a phase detector circuit for generating pulses having phase widths that are proportional to phase jitter on an incoming signal.

Referring to FIG. 3, input sections of the test apparatus 15 are illustrated. A converter 21 accepts the incoming waveform of FIG. 2A at the output 13 of the communication system and converts it to a square waveform of FIG. 2B at an output 23. The square waveform of FIG. 2B is then simultaneously applied to separate phase detectors 25 and 27. The first phase detector 25 compares the duration of the positive one-half of each square wave cycle of FIG. 2B to the duration of a reference pulse. The reference pulse has a duration equal to an average length of all positive one-half cycles of the input waveform of FIG. 2B. In the specific case illustrated with the waveforms of FIG. 2, this reference pulse has a length substantially equal to $\frac{1}{2}\tau_i$.

The second phase detector 27 of FIG. 3 compares each of the negative one-half cycles of the square wave of FIG. 2B with the length of another reference pulse. The duration of the reference pulse in the second phase detector 27 is an average of the duration of the negative one-half cycles of the input square wave of FIG. 2B. In the specific case illustrated in FIG. 2, this reference pulse will also have a length equal to $\frac{1}{2}\tau_i$. The use of separate phase detectors for the positive and negative half cycles of the input square wave allows examination of phase jitter frequency components up to the test tone frequency input to the communication system 11.

The first phase detector 25 includes a one-shot multivibrator 29 that generates a single square wave pulse at its output 31 with a length that is controlled by the magnitude of the control current applied to its control input 33. This reference pulse is used as a standard with which the incoming square wave is compared. A pulse is produced at the ouput 31 each time a positive rise in the incoming square wave is detected at its input 35. The multivibrator includes a trigger mechanism 37 which causes it to emit a pulse each time a positive rise is detected thereby. The multivibrator 29 is a current controlled type, such as one commercially available from the Texas Instrument Corporation under designation Ser. No. 74121. The output 31 of the multivibrator 29 is shown in FIG. 2C. It will be noted from FIG. 2C that at time $t_1$ a pulse 39 is begun at the output 31 of the multivibrator. That is, at the time $t_1$ when the incoming squarewave signal (FIG. 2B) rises in a positive direction, the output voltage level of the multivibrator 29 rises to form the pulse 39 whose duration depends upon the magnitude of current supplied to the input 33 of the multivibrator 29. At every other time $t_3$, $t_5$, $t_7$, etc., a positive rise in the waveform of FIG. 2B is respectively coincident with a leading edge of new pulses 41, 43, 45, etc, generated at the output 31 of the multivibrator.

The output pulses of the multivibrator 29 are received by an edge comparator 47. The edge comparator 47 also receives the input squarewave of FIG. 2B at a second input 49. A first output 50 of the edge comparator 47 is a series of pulses (FIG. 2D), a pulse being generated each time the duration of a positive cycle of the squarewave at 23 and 49 (FIG. 2B) is greater than the duration of the reference pulse (FIG. 2C) that occurs at the same time. Such pulses are referred to herein as of a P type. Referring to FIG. 2D, a pulse 53 at the output 50 of the edge comparator 47 has a duration which is equal to the difference between the length of the positive going squarewave half-cycle of FIG. 2B between times $t_3$ and $t_4$ and the length of the reference pulse 41 at the multivibrator output 31 that occurs at the same time. In the example waveform shown in FIG.

2, a second P pulse 55 (FIG. 2D) is of a longer duration since the next positive half-cycle of the square wave of FIG. 2B between times $t_5$ and $t_6$ is even greater than the reference pulse 43 duration than before.

A second output 51 of the edge comparator 47 of FIG. 3 produces a train of pulses shown in FIG. 2E, one pulse each time a positive one-half cycle of the square wave (FIG. 2B) is shorter than the reference pulse duration (FIG. 2E). These pulses are referred to as an N type. Each pulse of FIG. 2E has a duration equal to the difference between the lengths of the reference pulse (FIG. 2C) and the positive one-half cycle of the input square wave (FIG. 2B). The edge comparator 47 is a logic circuit that is a combination of exclusive OR gates which performs the functions described above.

These differential pulses of FIGS. 2D and 2E are applied through the output lines 50 and 51 of FIG. 3 to a differential integrator 57 as part of a feedback loop to the input 33 of the multivibrator 29. The integrator 57 includes a differential amplifier 52, a feedback capacitor 54 and a capacitor 48. The integrator 57 is heavily damped so as to develop a voltage at its output 59 that is proportional to the average frequency of period $\tau_i$ of the input square wave of FIG. 2B. As this average period changes, the duration of the output pulse of the multivibrator 29 is thus changed by an increase or decrease in the current at its input 33. A voltage to current converter 61 is required when the multivibrator is of the preferred constant current type and produces a current at 33 that is directly proportional to the voltage at 59.

The P pulses at 50 (FIG. 2D) are deivered to one input of the amplifier 52 and thus tend to drive the voltage output 59 in one direction. The N pulses at 51 (FIG. 2E) are delivered to a second input of the amplifier 52 and thus tend to drive the voltage output 59 in the other direction. It can be seen, as an example, that as the average period of the input square wave of FIG. 2B is increased a significant amount, the P pulses (FIG. 2D) at 50 will become large in duration while the N pulses (FIG. 2E) will become smaller and probably disappear altogether. This causes the output voltage 59 to move in the one direction caused by P pulses. The current at 33 to the multivibrator 29 thus changes and the duration of its output pulses (FIG. 2C) will increase until the P pulses (FIG. 2D) and N pulses (FIG. 2E) again are balanced in tending to move the voltage output 59. The voltage output 59 is then proportional to the new square wave average frequency. The multivibrator will emit pulses at 31 having a new duration for as long as the square wave fundamental frequency is maintained at its new level.

The phase detector 25 is a half-cycle "phase lock loop." As the input frequency at 13, and thus the square wave representation at 23, is altered in frequency, the circuit automatically compensates to develop signals proportional to phase jitter at this new frequency. Thus, the signal generator 19 of FIG. 1 may be changed from one frequency to another to examine phase jitter of the communication system 11 at many different distinct frequencies. The phase jitter test apparatus 15 is capable of handling the wide range of test frequencies (300–3,000 Hz.) and automatically accommodates to any changes in test frequency.

A desired indication of phase jitter in a signal being analyzed is obtained from the train of pulses of FIGS. 2D and 2E that is developed at the outputs 50 and 51, respectively, of the edge comparator 47.

So far only the positive half cycles of the square wave input at 23 (FIG. 2B) have been measured. The second phase detector 27 is provided for independently observing phase jitter in the negative half cycles of the square wave at 23. A second half cycle "phase lock loop" is provided as part of the phase detector 27 that is substantially the same as that described hereinabove with respect to the first phase detector 25. A second one-shot multivibrator 63 is employed that is the same as the multivibrator 29 except for a different trigger circuit 65. A pulse is emitted from the multivibrator 63 each time the square wave at 23 (FIG. 2B) has a negative slope. The output of the multivibrator 63 is shown in FIG. 2F wherein the leading edge of each of the pulses at $t_2$, $t_4$, etc., is coincident in time with the occurrence of the negative going portion of the square wave of FIG. 2B. An output 67 of the edge comparitor in the second phase detector 27 is a series of p pulses as shown in FIG. 2G. These are denoted as the p type since they occur only when the negative one-half cycle of the square wave is of a greater length than the reference pulse (FIG. 2F) occurring at the same time. An output 68 is a series of N pulses as shown in FIG. 2H, one pulse each time anegative one-half cycle of the square wave (FIG. 2B) is a negative duration than is associated reference pulse (FIG. 2F). The phse detector 27 operates in the same manner as the phase detector 25 but is driven by a different portion of the input signal.

The P pulse output at 50 is combined with the p pulse output at 67 in an OR gate 56. The N pulse output at 51 is combined with the N pulse output at 68 in an OR gate 58.

The P and N outputs of FIG. 3 at the OR gates 56 and 68, respectively, make up the basic phase jitter data from which a communication system may be analyzed. The width of the pulses, both a maximum pulse width (peak per cycle) and the cumulative widths (total peak to peak), gives phase jitter information that is highly useful. The following discussion is directed at four different specific ways of displaying phase jitter quantities from the P and N pulses at the output of FIG. 3. Both digital and analog techniques are described for picking out and displaying the duration of the longest pulse at the P or N output. Also, digital and analog techniques are alternately described for displaying a peak-to-peak magnitude of accumulated pulses. In all four specific techniques described hereinafter, the duration of the pulses at the P and N outputs are measured in terms of degrees; that is, are measured as a fraction of the average period $\tau_i$ of the output signal being examined. This permits a change of the signal generator test frequency without changing the basis upon which the phased displacement or jitter of the output signal is measured.

Digital Techniques

Figure 4:
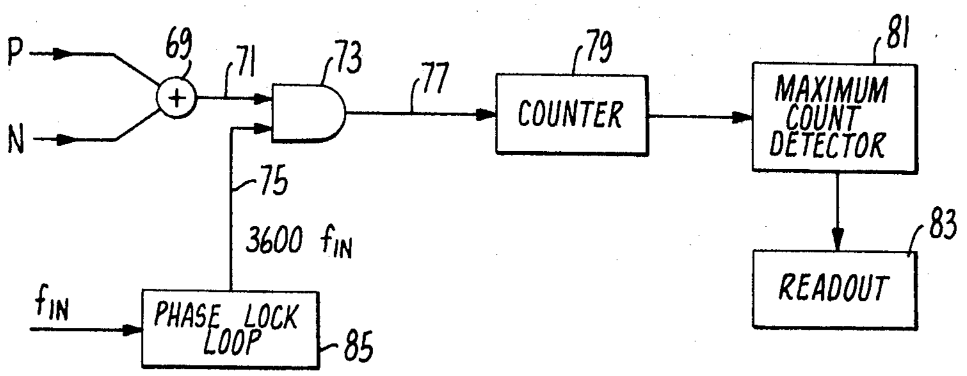
FIG. 4 schematically illustrates in block diagram form a digital circuit for determining the peak-per-cycle jitter from the output pulses of the circuit of FIG. 3.

Referring to FIG. 4, a circuit is shown in block diagram form for displaying a maximum phase jitter in degrees. The maximum phase jitter is obtained by picking out the longest duration pulse from those presented at either of the P or N outputs of FIG. 3 during a given period of time. The duration of that maximum pulse is measured in terms of degrees where the base 360° of one full cycle is determined from the period $\tau_i$. The P and N outputs are combined in FIG. 4 in an OR gate 69 to form a continuous train of pulses in a line 71. The line 71 forms one input to an AND gate 73. A second input 75 to the AND gate 73 is connected with a clock oscillator. This oscillator is operated at a frequency that is a multiple of the average frequency $f_{ave}$ of the waveform under investigation (FIGS. 2A and 2B). The AND gate 73 lets a plurality of cycles of the clock oscillator pass to its output 77 for the duration of each of the P and N pulses being observed.

Each of the clock oscillator cycles at 75 that is passed to 77 during each of the P and N pulses increments a digital counter 79. A maximum count detector 81 stores the count of the counter 79 for each P and N pulse, compares thiscount with that of the previous maximum and resets the lower count. The maximum count over some predetermined period of time is then displayed by a readout circuit 83. The basic building blocks described above with respect to FIG. 4 are well known in the art.

The clock oscillator developing the signal at 75 is tied to the input frequency $f_{in}$ at 23 of FIG. 3. As the average frequency $f_{ave}$ goes up, so does the clock oscillator frequency at 75 on FIG. 4 in order that the count of the number of clock oscillator cycles contained in a P or N pulse is directly proportional to phase jitter in degrees. A preferable clock oscillator is a phase lock loop 85 which generates at 75 a clock signal that has a frequency 3600 $f_{ave}$. Details of such a phase lock loop may be had by reference to copending application Ser. No. 90,103, filed Nov. 16, 1970 by the applicant herein now herein, Pat. No. 3,701,953 issued Oct. 31, 1972. This copending application is incorporated herein by reference for details of one way of developing a clock signal at 75.

Figure 5:
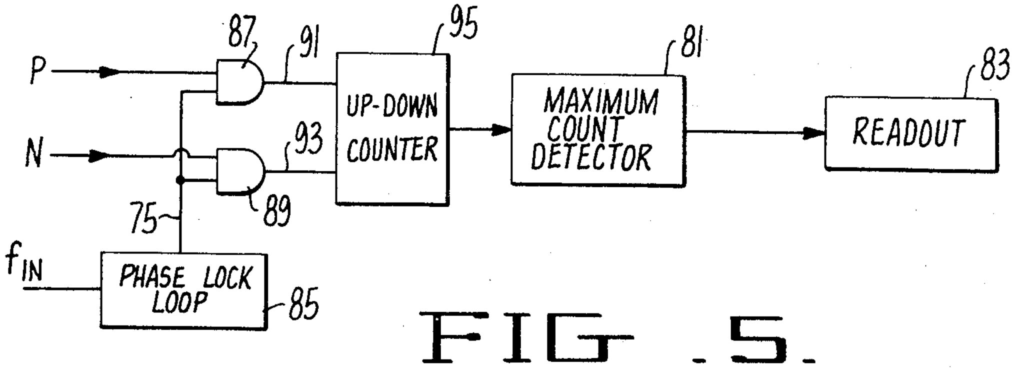
FIG. 5 schematically illustrates in block diagram form a digital circuit for determining total peak-to-peak phase jitter from the output pulses of the circuit of FIG. 3.

Referring to FIG. 5, a digital technique is shown for detecting and displaying the maximum peak-to-peak phase jitter, a quantity which is determinable to a limited degree by existing phase jitter test sets. In this case, a clock oscillator signal line 75, preferably the output of the phase lock loop 85, is independently combined with the P and N pulse carrying lines by separate AND gates 87 and 89. Outputs 91 and 93 of these AND gates are connected by an up-down counter 95 in a manner that the counter increments in one direction When P (FIG. 2D) pulses are received at the AND gate 87 while incrementing in an opposite direction when N pulses are received at the AND gate 89. The counter 95 is driven by the clock oscillator signal at line 75 for the duration of the respective P and N pulses. The maximum count of the up-down counter 95 is noted by the maximum count detector 81 and displayed in the readout 83.

The digital implementation is also described in the aforementioned IEEE article of the applicant herein.

Analog Implementation

Figure 6:
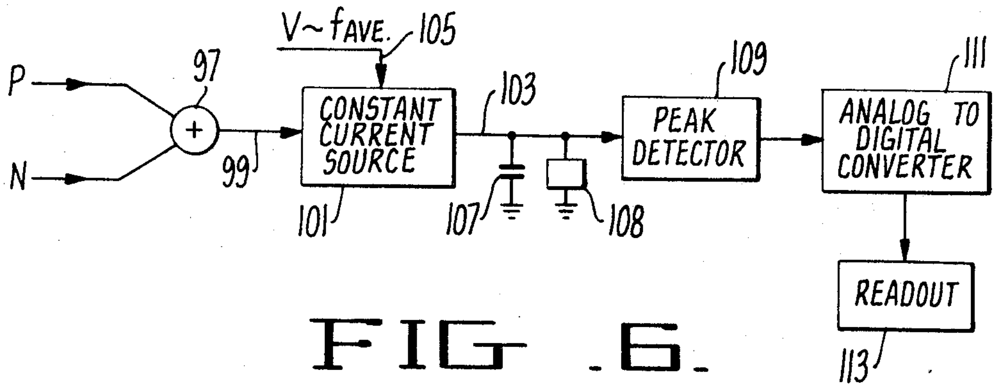
FIG. 6 schematically illustrates in block diagram form an analog circuit for determining the peak-per-cycle phase jitter from the output pulses of the circuit of FIG. 3.

Analog techniques for measuring the duration of P and N pulses has been found preferable for reasons of simplicity and economy. Referring to FIG. 6, an analog circuit is shown in block diagram form for measuring the peak-per-cycle phase jitter. The duration of the longest P or N pulse developed by the circuit of FIG. 3 is measured by the circuit of FIG. 6. The P and N outputs of FIG. 3 are combined in an OR gate 97 to provide a single train of pulses 99 that triggers on and off a current source 101. An output 103 of the current source 101 is adjustable in magnitude by a voltage applied to an input 105. The voltage that is applied to the input 105 is proportional to the average frequency $f_{ave}$ of the input waveform of FIGS. 2A and 2B. This voltage has already been described to exist in FIG. 3 at the output 59 of the integrator 57 and exists as well at the output of the integrator of the second phase detector 27. The train of pulses in the line 99 is a combination of those shown in FIGS. 2D, 2E, 2G and 2H. The output 103 of the current source 101 is a train of pulses having the same time duration of those at the input line 99 and with a slope that is determined by the voltage input 105. The magnitude of the output pulses is thereby made proportional to the average frequency of the input waveform to the tester. This enables a correct reading in degrees for all input frequencies.

A capacitor 107 is connected across the output 103 of the current source 101 and is changed thereby. For each P or N pulse, the capacitor 107 is charged to a voltage thereacross that is proportional to the duration of the pulse and magnitude of current. The magnitude of voltage across the capacitor 107 resulting from a single P or N pulse is also related to the voltage at the input 105. A peak detector 109 observes the voltage across the capacitor 107 for each P or N pulse. After each pulse, a transistor circuit 108 discharges the capacitor 107. The magnitude of the maximum voltage spike produced across the capacitor 107 after a series of pulses is noted by the peak detector 109. This maximum voltage is then converted into a binary representation by an analog to digital converter 111 and in this binary representation is displayed by an appropriate display 113 and associated logic circuitry.

Referring to FIG. 2J, the voltage pulse spikes across the capacitor 107 are illustrated. At each pulse of FIGS. 2D, 2E, 2G and 2H, a voltage spike of FIG. 2J is produced across the capacitor 107. The slope of the leading edge of each spike is determined by the magnitude of the current source 101 in its output 103 so that the height of the spikes of FIG. 2J is directly proportional to the average frequency of the waveform of FIG. 2A as well as directly proportional to the length of the associated P or N pulse which generates a given spike voltage waveform. This enables a correct reading in degrees for all test tone frequencies.

Figure 7:
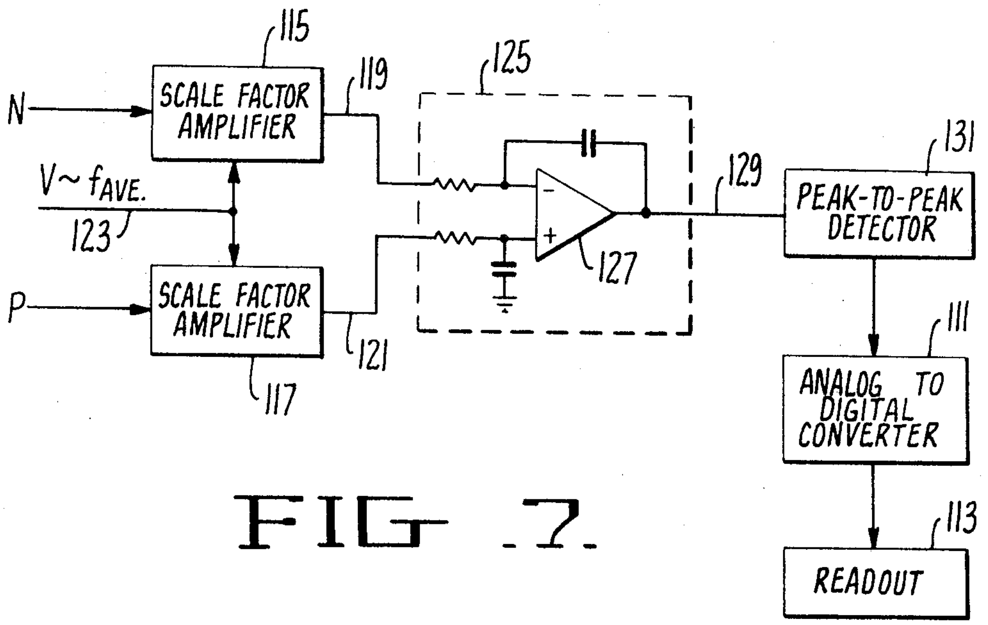
FIG. 7 schematically illustrates in block diagram form an analog circuit for determining total peak-to-peak phase jitter from the output pulses of the circuit of FIG. 3.

Referring to FIG. 7, an analog technique for determining the peak-to-peak cumulative phase difference is described. The N and P pulses at the output of FIG. 3 are separately applied to the independent scale factor amplifiers 115 and 117 having outputs 119 and 121, respectively. The purpose of the amplifiers 115 and 117 is to control the magnitude of pulses in the lines 119 and 121. The gain of the pulse amplifiers 115 and 117 is controlled by a voltage in line 123 that is proportional to the average frequency $f_{ave}$ of the wave form under investigation. As discussed above, this voltage is derived from the output line 59 of FIG. 3. Therefore, the pulse magnitudes at the outputs 119 and 121 of the respective N and P pulse amplifiers are adjusted by the average frequency. These adjusted pulses are then applied to the input of a differential integrator 125. All of this is necessary to provide a correct degree reading for any input test tone frequency. The integrator 125 includes a differential operational amplifier 127 with a capacitor in its feedback loop. It will be noted that the modified P pulses are applied through the line 121 to a non-inverting input of the amplifier 127 and thus tend to drive its output 129 down. The response time of the differential integrating amplifier 125 is made very short so that its output 129 responds to all changes that may occur even at a rate as fast as that of the highest test tone frequency.

The output waveform at 129 is illustrated in FIG. 2K wherein each of the pulses of FIGS. 2D, 2E, 2G and 2H affect the output magnitude. A peak-to-peak detector 131 of FIG. 7 measures the difference between a maximum 133 and a negative 135 of FIG. 2K. This difference is proportional to the duration of each of the P and N pulses which contribute to it as well as the average frequency $f_{ave}$ of the signal under investigation. This peak difference value is fed from the detector 131 to the analog to digital converter 111 and thus to a digital readout system 113.

An instrument for measuring phase jitter in an output signal preferably includes both functions described with respect to FIGS. 6 and 7, as well as those described with respect to FIG. 3. This has been done in a single instrument marketed by the assignee of the present application, Telecommunications Technology, Incorporated, of Palo Alto, Calif. in an instrument identified as TTI 1200 and referred to as a phase jitter test set.

It is understood that the scope of the contribution to the art by the various aspects of the present invention is not limited to the specific embodiments described herein but rather that the invention is entitled to the full scope defined by the appended claims.

What is claimed is:

1. A method of testing a communication circuit for phase jitter, comprising the steps of:

inserting a test signal into an input of said communication circuit, measuring the duration of each one-half cycle of the test signal at an output of the communication circuit, determining an average one-half cycle duration of the signal at the output of said communication circuit and, comparing each one-half cycle duration with said average one-half cycle duration to determine differences therebetween, whereby the differences between the one-half cycle durations of the test signal output and the average one-half cycle duration indicate phase jitter of the test signal at the output of the communication circuit.

2. A method of measuring a disturbance in the periodicity of zero crossings of a test signal, comprising the steps of:

measuring the duration of each one-half cycle of the test signal, determining an average one-half cycle duration of the test signal, comparing each one-half cycle duration with said average one-half cycle duration to determine difefereces therebetween, and expressing the individual differences between the one-half cycle durations of the test signal and the average one-half cycle duration in terms of degress of said average one-half cycle duration.

3. A method of measuring a disturbance in the periodicity of zero crossings of a test signal, comprising the steps of:

measuring the duration of each one-half cycle of the test signal, determining an average one-half cycle duration of the test signal, comparing each one-half cycle duration with said average one-half cycle duration to determine differences there-between, and identifying and measuring the peak difference between the one-half cycle durations of the test signal and the average one-half cycle duration, whereby said peak difference over a predetermined period of time is a useful indication of per-cycle peak jitter.

4. A method of measuring a disturbance in the periodicity of zero crossings of a test signal, comprising the steps of:

measuring the duration of each one-half cycle of the test signal, determining an average one-half cycle duration of the test signal, comparing each one-half cycle duration with said average one-half cycle duration to determine differences therebetween, totalling said differences in a manner that the one-half cycles of the test signal that are greater in duration than the average one-half cycle duration are given one sign while the differences arising from the one-half cycles of the test signal that are less in duration than the average one-half cycle period are given an opposite sign, and observing said total, whereby said total is a useful indication of total peak-to-peak phase jitter.

5. A method of observing phase jitter in an electrical signal, comprising the steps of:

deriving from said electrical signal a square wave signal having alternative high level and low level values with a frequency that follows that of said electrical signal.

keying a first pulse generator coincident in time with a rising edge of each square wave cycle, thereby to generate a pulse simultaneous with each positive one-half cycle of the square wave, keying a second pulse generator coincident in time with the descending edge of each square wave cycle, thereby to generate a pulse simultaneous with each negative one-half cycle of the square wave, comparing the duration of each pulse generated by the first pulse generator with the duration of its simultaneous positive one-half cycle of the square wave signal and generating a differential pulse having a duration proportional to the difference in duration therebetween, comparing the duration of each pulse generated by the second pulse generator means with the duration of its simultaneous negative one-half cycle of the square wave signal and generating a differential pulse having a duration proportional to the difference therebetween, integrating the positive one-half cycle differential pulses and applying the integrated value of said first pulse generator to control the duration of the pulses generated thereby;

integrating the negative one-half cycle differential pulses and applying the integrated value to said second pulse generator to control the duration of the pulses generated thereby, whereby the duration of said differential pulses is indicative of per cycle phase differences in the electrical signal with respect to an average period thereof.

6. A phase jitter test apparatus, comprising means responsive to a test signal for generating a pulse concurrently with each positive one-half cycle of said signal, each of said pulses having a duration equal to the difference between the duration of one positive half cycle and one-half an average period of said test signal, means responsive to said test signal for generating a pulse concurrently with each negative one-half cycle of said signal, each of said pulses having a duration equal to the difference between the duration of one negative half cycle and one-half the average period of said test signal, and means measuring the width of each of said generated difference pulses in degrees of the average period of said test signal.

7. Apparatus according to claim 6 which additionally comprises:

means for selecting from the difference pulses generated during a predetermined length of time the one pulse that has a maximum width.

8. Apparatus according to claim 6 wherein said means for generating a pulse concurrently with each positive one-half cycle and said means for generating a pulse concurrently with each negative one-half cycle each include a phase lock loop comprising, a one-shot multivibrator that is triggered by the test signal, an edge comparator receiving the multivibrator output and comparing it to the corresponding test signal one-half cycles, thereby to develop said pulses, and a differential integrator receiving said pulses, the output of the integrator being fed back to said multivibrator to control its operation.

9. Apparatus according to claim 6 wherein both said positive one-half cycle difference pulse generating means each include two outputs, a first output emitting a P difference pulse at each occurrence when a test signal one-half cycle has a duration greater than said one-half an average period of the test signal, a second output emitting a N difference pulse at each occurrence when a test signal one-half cycle has a duration less than said one-half an average period of the test signal.

10. Apparatus according to claim 9 wherein said means measuring the width of each of said generated difference pulses comprises:

means for combining the first and second difference pulse outputs of both the positive one-half cycle difference pulse generating means and the negative one-half cycle difference pulse generating means into a single output, means receiving combined P and N pulses from said single output for emitting an electrical pulse coincident in time with each P and N pulse applied thereto, the magnitude of said output electrical pulses being proportional to said one-half the average period of said test signal, means receiving the output of said emitting means for integrating each of its said output electrical pulses, and a peak detector monitoring an output of said integrating means, whereby the largest integrated value of the emitting means output pulses for a time is a measure of peak-per-cycle phase jitter of said test signal.

11. Apparatus according to claim 9 wherein said means measuring the width of each of said generated difference pulses comprises:

means combining the first outputs of said one-half cycle difference pulse generating means and for adjusting the magnitude of their N pulses by a factor proportional to said one-half the average period of said test signal, means receiving the adjusted magnitude P pulses and adjusted magnitude N pulses for developing at a single output a signal level that is driven in one direction by the adjusted magnitude P pulses and an opposite direction by the adjusted magnitude N pulses, and a peak-to-peak detector for measuring the maximum signal level change at the single output of said signal level developing means, whereby the maximum signal level change is a measure of the total peak-to-peak phase jitter of said test signal.

12. Apparatus according to claim 9 wherein said means measuring the width of each of said generated difference pulses comprises:

means for combining the first and second difference pulse outputs of both the positive one-half cycle difference pulse generating means and the negative one-half cycle difference pulse generating means into a single output, means for digitally counting the duration of the P and N pulses at said single output, and means for detecting the maximum count of said digital counting means, whereby the maximum pulse duration count for a time is a measure of peak-per-cycle phase jitter of said test signal.

13. Apparatus according to claim 9 wherein said means measuring the width of each of said generated difference pulses comprises:

a digital up-down counter, means combining the first outputs of said one-half cycle difference pulse generating means for driving said counter in one direction a count proportional to the width of said P pulses and to said test signal one-half average period, means combining the outputs of said one-half cycle difference pulse generating means for driving said counter in an opposite direction a count proportional to the width of said N pulses and to said test signal one-half average period, means monitoring said counter for detecting the maximum count difference of the counter, whereby said maximum count difference is a measure of the total peak-to-peak phase jitter of said test signal.

14. Apparatus for measuring a disturbance in the periodicity of zero crossings of an alternating current signal, comprising:

means responsive to said alternating current signal for generating a reference pulse upon the occurrence of detected zero crossings of the alternating current signal, said reference pulse generating means including an input receiving a signal that sets the duration of said reference pulse, means receiving said reference pulse and said alternating current signal for emitting a first output signal proportional to an excess in time of the period of occurrence of said detected zero crossings relative to the width of said reference pulse, and for emitting a second output signal proportional to an excess in time of the width of said reference pulse relative to the period of occurrence of said detected zero crossings, means receiving said first and second output signals for applying a signal to the pulse duration control input of said reference pulse generating means that is proportional to the average difference in the signals of said first and second outputs, thereby to form a closed loop system that assures the reference pulse generating means output to be proportional to the fundamental frequency of said alternating current signal, and means receiving said first and second output signals and responsive to the duration of said reference pulse for developing an output signal indicative of the first and second output signals as a function of the average frequency of said alternating current signal.

15. A method of measuring a disturbance in the periodicity of zero crossings of an alternating current signal, comprising:

measuring the time duration between detected zero crossings of said alternating current signal, determining an average time period between the detected zero crossings of said alternating current signal, determining a difference of the time duration between successive detected zero crossings with the average period of recurrence of the detected zero crossings, and expressing said time difference as a function of said average period.

16. The method as defined by claim 15 wherein said detected zero crossings occur once each full cycle of said alternating current signal.

17. Apparatus for measuring a disturbance in the periodicity of zero crossings of an alternating current signal, comprising:

means responsive to said signal for comparing the time between successive detected zero crossings of said signal to an average time period between said detected zero crossings, and means responsive to said comparison means for expressing said time comparison as a proportion of said average time period.

18. Apparatus for measuring a disturbance in the periodicity of zero crossings of an alternating current signal, comprising:

means responsive to said signal for emitting a pulse having a duration equal to a difference in time between successive detected zero crossings of said signal and an average time period between said detected zero crossings, a P type pulse being emitted on each occurrence when the time between successive detected zero crossings exceeds said average time period, and an N type pulse being emitted on each occurrence when said average time period exceeds the time between successive detected zero crossings, and means responsive to said pulse emitting means for measuring the duration of the longest P or N type pulse as a proportion of said average time period.

19. Apparatus for measuring a disturbance in the periodicity of zero crossings of an alternating current signal, comprising:

means responsive to said signal for emitting a pulse having a duration equal to a difference in time between successive detected zero crossings of said signal and an average time period between said detected zero crossings, a P type pulse being emitted on each occurrence when the time between successive detected zero crossings exceeds said average time period, and an N type pulse being emitted on each occurrence when said average time period exceeds the time between successive detected zero crossings, and means responsive to said pulse emitting means for separately totalling the duration of the P and N type pulses for a time and for expressing a time difference of said totals as a proportion of said average time period.

* * * * *